United States Patent [19]

Nakajima et al.

[11] Patent Number: 5,620,650
[45] Date of Patent: Apr. 15, 1997

[54] METHOD FOR INJECTION STRETCH BLOW MOLDING OF POLYETHYLENE

[75] Inventors: Hisashi Nakajima, Nagano-ken; Hideaki Koda, Ueda, both of Japan

[73] Assignee: A.K. Technical Laboratory Inc., Japan

[21] Appl. No.: 325,031

[22] Filed: Oct. 18, 1994

[30] Foreign Application Priority Data

Oct. 22, 1993 [JP] Japan .................................. 5-286193
Feb. 28, 1994 [JP] Japan .................................. 6-054751

[51] Int. Cl.$^6$ .................................................. B29C 49/64
[52] U.S. Cl. .................................................. 264/520; 264/532
[58] Field of Search .................................. 264/520, 532; 425/526

[56] References Cited

U.S. PATENT DOCUMENTS

| | | | |
|---|---|---|---|
| 3,979,491 | 9/1976 | Zavasnik | 264/520 |
| 4,019,849 | 4/1977 | Farrell | 425/445 |
| 4,044,086 | 8/1977 | McChesney et al. | 264/520 |
| 4,116,606 | 9/1978 | Valyi | 425/526 |
| 4,207,134 | 6/1980 | Valyi | 425/526 |
| 4,242,300 | 12/1980 | Valyi | 264/532 |
| 4,323,340 | 4/1982 | Uhlig | 425/526 |
| 4,356,142 | 10/1982 | Germanio | 264/520 |
| 4,376,090 | 3/1983 | Marcus | 264/532 |
| 4,473,515 | 9/1984 | Ryder | 264/532 |
| 4,615,667 | 10/1986 | Roy | 264/532 |
| 5,364,585 | 11/1994 | Takeuchi | 264/520 |

FOREIGN PATENT DOCUMENTS

| | | |
|---|---|---|
| 0012426 | 6/1980 | European Pat. Off. . |
| 0454997 | 3/1991 | European Pat. Off. . |
| 53-47457 | 4/1978 | Japan .................... 264/520 |

*Primary Examiner*—Catherine Timm
*Attorney, Agent, or Firm*—Ostrolenk, Faber, Gerb & Soffen, LLP

[57] ABSTRACT

A method enabling stretch blow molding in a temperature range preferable for polyethylene and capable of releasing at a surface temperature suited to both releasing of a preform and subsequent stretch blow molding, by disconnecting the core die and the preform in advance by the use of pressure of gas. The injection molding of a predetermined preform involves filling an injection mold with molten polyethylene, releasing the preform from the cavity die and core die of the injection mold while a mouth portion of the preform is held by the lip die, and transferring the preform into a blow die to stretch blow mold into a hollow molded thin wall product. Gas forcibly enters into the boundary of the core die and the preform, before releasing the preform from the injection mold to isolate the inside wall of the preform from the core die. Releasing is effected while the inside of the preform is not completely cooled and is still at high temperature, and in a temperature range in which the surface temperature of the preform right after releasing is 80 to 90 deg. C. The step of stretch blow molding is performed within the time interval before the surface temperature of the preform which is elevated by the internal heat of the preform reaches 120 deg. C.

10 Claims, No Drawings ced with polyethylene which is high demand for hollow

METHOD FOR INJECTION STRETCH BLOW MOLDING OF POLYETHYLENE

BACKGROUND OF THE INVENTION

1. Field of the Invention

The present invention relates to a method for injection stretch blow molding of polyethylene into a hollow molded product, such as a thin-wall container.

2. Background Art

In an injection stretch blow molding method comprising injecting molten resin into an injection mold to mold a preform in a blow mold, and stretch blow molding the perform into a hollow molded product such as container, it is possible to mold almost all thermoplastic resins into hollow thin-wall products. At the present, however, the method's used is limited to polyethylene terephthalate, polypropylene, polycarbonate, vinyl chloride, etc., and not applied to polyethylene which is high demand for hollow molded products.

Known methods for molding continuously from injection molding of preform to stretch blow molding of hollow molded products include a method comprising releasing an injection molded preform from an injection mold while the preform is still hot before being completely cooled and solidified, conditioning the temperature of the hot preform, and stretch blow molding the conditioned preform into a hollow molded product in a blow mold, and also a method of immediately stretch blow molding by omitting the temperature conditioning of the preform, as disclosed in the Japanese Laid-open Patent Publication No. 4-214322.

In both injection stretch blow molding methods, a preform is molded by using an injection mold composed of a cavity die for molding the outside wall of the preform and a core die for molding the inside wall of the preform, and a lip mold for molding the mouth portion of the preform, and the cavity space between the cavity die and the core die is filled with molten resin inserted into the cavity die by penetrating through the opening of the cavity die and the closed lip mold by injecting the molten resin from the bottom of the cavity die.

To release the injection molded preform from the injection mold, both the core die and lip mold are moved upwardly, or the core die is moved upwardly and the cavity die is moved downwardly, and the preform, after being released, is transferred into the blow mold while the mouth portion of the preform is held by the lip mold.

The reason why the preform is released by being drawn out also from the core die is that it is extremely difficult to stretch the preform in the axial direction by a stretching rod in the state of tightly holding the core die by shrinkage of the preform due to cooling, and therefore the preform is drawn out from both the cavity die and the core die using the lip mold also as the transfer member, thereby transferring into the blow mold.

Usually, when releasing the injection molded product from the injection mold, withdrawing of the injection molded product from the core die is more difficult than withdrawing from the cavity die. This is because the surface of the outside wall of the molded product is parted from the surface of the cavity die due to shrinkage by cooling of the injection molded product at the cavity side, while the inside wall of the molded product tightly contacts the core die due to shrinkage to the core die side.

The strength of the hot preform in a flexible state that can be processed by stretch blow molding is only enough to maintain the shape of the preform by the surface skin layer formed on the inside and outside surfaces of the preform. This is different from the ordinary injection molded product which is completely rigid as a consequence of complete cooling and solidifying. Therefore when drawing out the core die by holding the cooled and solidified mouth portion of the preform by the lip mold, unless there is enough strength to disconnect the skin layer of the inside wall of the preform from tightly contact with the core die surface, the preform is drawn out from the cavity die in tight contact with the core die, and squeezed by the lip die in fixed state, deforming as if bellows were being contracted, and thereby losing the shape of the preform.

Accordingly, an injection stretch blow molding method is designed to release the preform after cooling the preform to a temperature so that the skin layer of the preform surface is rigid enough to withstand the withdrawing force of the core die while stretch blow molding is possible. Although the cooling temperature varies with the thickness and design of the required preform, when a preform of a container with a wide mouth in which blow-up ratio is not so large, the draft of the cavity die and core die can be set large. The contact force of the preform inside from shrinkage can be alleviated by the draft, release at high temperature is enabled, and shrinkage due to cooling decreases, and owing to synergistic action release, releasing is easier than in the case of a preform of a container with a narrow mouth.

However, in the case of a preform of a container with a narrow mouth such as a bottle whose aperture is small, size is long, and blow-up ratio is large, the draft of the cavity die and core die is limited, and the limit becomes stricter as the length is greater. It is hence necessary to release the preform from the injection mold by cooling the preform to the compatible temperature enabling both release and subsequent stretch blow molding. This compatible temperature is, at ordinary temperature, 60 to 70 deg. C. in the case of polyethylene terephthalate, and 90 to 100 deg. C. in the case of polypropylene. In these temperature ranges, both release and stretch blow molding can be carried out.

However, in the case of a preform of polyethylene, which is excellent in thermal conductivity and high in molding shrinkage as compared with polyethylene terephthalate and polypropylene, when cooled to drawable temperature, the skin layer is formed thicker than necessary, and the internal high temperature region becomes narrow. Therefore if the preform is immediately transferred into the blow mold and processed by stretch blow molding, it is not swollen sufficiently by air pressure. At a temperature at which stretch blow molding is estimated to be possible, the preform remains tightly in contact with the core die, and when the core die is drawn out in this state, the preform is extremely deformed.

Therefore, with polyethylene preform, setting of the compatible temperature enabling both release and subsequent stretch blow molding is more difficult than in the case of polyethylene terephthalate or the like, and stretch blow molding by using the hitherto employed releasing means was extremely difficult even in the case of a container with a wide mouth.

It may be also considered to perform stretch blow molding by reheating and conditioning the preform after releasing to temperature suited to molding, but this requires experience, time, and energy, and temperature unevenness is likely to occur. Therefore, if temperature conditioning is employed, the injection stretch blow molding of polyethylene involves many technical difficulties.

Concerning polyethylene, aside from releasing, the difficulty also lies in the temperature for stretch blow molding the preform. In a blow molding method, the resin temperature for blow molding polyethylene is 175 to 200 deg. C. In an injection stretch blow molding method, such resin temperature is the molding temperature of the preform, and the temperature of a preform cooled so as to be self-supporting is extremely lower than such resin temperature.

When stretch blow molding the preform released at high temperature into a container such as a bottle before the surface temperature of the preform from the internal heat reaches the peak temperature, the time the surface temperature of polyethylene reaches the peak temperature is earlier than in the case of polyethylene terephthalate, and stretch blow molding polyethylene is difficult as compared with polyethylene terephthalate. It is hard to obtain a molded product excellent in wall thickness distribution near the peak temperature.

As a difficulty of stretch blow molding, it is estimated, since the thermal conductivity of polyethylene is higher than that of polyethylene terephthalate and polypropylene, transferring the internal heat of the preform to the surface of the preform after being released is relatively quick, the volume occupied by the internal high temperature portions contributing to the stretch blow molding becomes narrow earlier, and hence the internal heat quantity necessary for stretch blow molding tends to be insufficient. Hence, even in the case of a container with a wide mouth which is usually easier to release than a container with a narrow mouth, a favorable molded product can not be obtained unless stretch blow molding is done within a limited time (within temperature range).

Reaching peak temperature differs somewhat depending on the wall thickness of preform, design or molding conditions, and better products are not obtained unless stretch blow molding is adjusting accordingly. Therefore in the case of polyethylene, a severer molding operation is required than in the case of polyethylene terephthalate.

The present invention is devised in order to solve the problems in a method for injection stretch blow molding of polyethylene, and it is an object to present a novel method enabling to released a preform at a surface temperature compatible for both releasing of preform and subsequent stretch blow molding, by disconnecting the core die and the surface of the preform in advance by the use of pressure of a gas, and to perform stretch blow molding in a specified temperature range preferable for polyethylene.

SUMMARY OF THE INVENTION

To achieve the object, the invention presents a method for injection stretch blow molding of polyethylene comprising the steps of;

injection molding a predetermined preform by filling an injection mold composed of a cavity die, a core die, and a lip mold with molten polyethylene, releasing the preform from the cavity die and the core die of the injection mold while an mouth portion of the preform is held by the lip mold, transferring the preform into a blow die, and stretch blow molding the preform into a hollow thin-wall product, characterized in that the method further comprises the steps of forcibly entering a gas into the boundary between the core die and the preform before releasing the preform from the injection mold in order to isolate the inside wall of the preform from the core die, releasing the preform from the injection mold while the inside of the preform is not completely cooled and is still at high temperature, and the surface temperature of the preform right after releasing is 80 to 90 deg. C., and stretch blow molding the preform within the time interval before the surface temperature of the preform which is elevated by the internal heat of the preform reaches 120 deg. C.

DETAILED DESCRIPTION OF THE PREFERRED EMBODIMENTS

The temperature of the molten polyethylene at the time of molding the preform is required to be 200 deg. C. or more as the temperature of the front portion of the injection cylinder. This molten polyethylene is injected to fill up the cavity of the injection mold composed of the cavity die set at a temperature of 90 to 105 deg. C. and the core die set at a temperature around 80 deg. C., and molded into a preform with a bottom as prescribed.

When the injection filling of molten polyethylene is completed, the injection pressure is changed to a secondary pressure lower than the primary pressure required for filling, to transfer to injection pressure holding step, which is followed by cooling step. As to the gas for disconnection, air is most preferable from the viewpoint of economy and handling, but an inert gas such as nitrogen gas may be used. Meanwhile, if pressure feeding (i.e. entering gas) is started right after completion of injection filling, it has no effect on the shape of the preform. It is most preferable to start pressure feeding immediately after completion of injection pressure holding. If pressure feeding is started just before completion of injection filling, filling resistance occurs due to elevation of internal pressure by the pressure of the fed gas, and the specified amount of molten resin is not applied, and hence the predetermined shape of the preform can not be obtained.

The gas is blown into the boundary of the core die and the preform from the root or front end of the core die. The entering position can be selected by the length or thickness of the preform, and in a long preform, it is desired to introduce the gas from the front end. Besides, since the object of the entering gas is to disconnect the core die and the inside wall of the preform, the injected gas is held in the boundary for a specific time, and the preform inside is isolated from the core die surface, so that the preform is cooled to a temperature suited to releasing. The entering (blow) time requires at least one second, and the entering (blow) pressure is in a range of 6 to 15 kg/cm$^2$, preferably around 9 kg/cm$^2$.

The preform is released in the above-described temperature range, and the stretch blow molding can be effected in a temperature range of the preform surface temperature of 20 to 30 deg. higher than that at releasing. If the surface temperature is 100 deg. C. or less. the temperature is too low, and entire stretching by gas pressure is not achieved, and molding is extremely difficult. At an elevation of 30 deg. or more, it is too close to the peak temperature, and the temperature rise is slow, and the preform is likely to be crystallized. Accordingly, if the surface temperature of the preform after releasing exceeds 120 deg. C., stretch blow molding of molded product with favorable wall thickness distribution is difficult.

Accordingly, the most preferable temperature for stretch blow molding is around a temperature elevated about 25 deg. from the surface temperature at the time of releasing, and it is in a range of 4 to 7 seconds after releasing in terms of the time. The peak temperature of the preform elevated by the internal heat is somewhat higher or lower depending on the wall thickness of the preform, but the time to reach the peak temperature do not vary significantly.

Therefore, by varying the wall thickness distribution to adjust the internal heat, thereby causing elongation depending on the blow ratio on the preform, containers of favorable wall thickness distribution and the like are obtained, except for the case of extreme wall thickness difference, and stretch blow molding is enabled in a favorable temperature range on the whole within a specific time lapse after releasing.

The air blowing pressure at the time of stretch blow molding can be varied in primary and secondary steps, and the secondary pressure should be set at a pressure of two times or more of the primary pressure. Stretching can be done about two times vertically and three times laterally.

In this method, when releasing the preform of polyethylene, gas forcibly enters into the boundary between the core die and the inside wall of the preform, and cooling is effected by disconnecting the preform inside, and therefore cooling of the preform inside is suppressed by the gas existing in the boundary between the core die and also the inside wall of the preform, and the inside skin layer of the preform is formed thinner than the case of tight contact of the inside skin layer of the preform, and the shrinkage of the preform inside is smaller by that portion, and the contact is alleviated.

To the contrary, on the outside of the preform, the surface is pressed to the cavity side by the injected gas so as to be cooled easily, and separation by shrinkage due to cooling is prevented, and the skin layer is quickly formed so as to maintain the shape of the preform, and later it is possible to release the preform at a surface temperature suited to stretch blow molding. Because of quick cooling, moreover, crystallization is extremely small.

Besides, in the process of elevation of surface temperature due to the internal heat of the preform, crystallization is suppressed by heating from the inside, and its growth is slow, and stretching is not disturbed by crystallization so that stretch blow molding can be done smoothly even with polyethylene, and molded products such as containers of favorable wall thickness distribution can be obtained.

Embodiments

EXAMPLE 1

| Material resin: | Polyethylene (HIZEX 5300B, made by Mitsui Petrochemicals Co.) |
|---|---|
| Molded product: | Milk bottle (500 cc) |
| Dimensions: | overall height 165 mm, inside diameter of mouth portion 32 mm, length beneath neck 147.5 mm, outside diameter of body portion 73 mm, wall thickness of body portion 0.5 mm, weight 32 g |
| Preform | |
| Dimensions: | overall height 137.5 mm, inside diameter of mouth portion 32 mm, length beneath neck 120 mm, wall thickness of body portion 3 mm, outside dia. of upper body portion 34.68 mm, outside dia. of lower end body portion 31.62 mm, draft 0.766 deg. |
| Preform molding conditions | |
| Injection cylinder temperature: | nozzle 175 deg. C., front portion 215 deg. C., middle portion 215 deg. C., rear portion 185 deg. C. |
| Injection mold temperature (set value): | |
| Cavity die: | upper portion 10 deg. C., cavity portion 95 deg. C., lower portion 10 deg. C. |
| Core die: | 80 deg. C. |
| Injection pressure (holding pressure): | 42 kg/cm$^2$ |
| Pressure holding time: | 6.5 sec |
| Cooling time: | 1.8 sec |
| Entered (blow) gas: | air |
| Entering (blow) pressure: | 9 kg/cm$^2$ |
| Entering timing: | right after completion of pressure holding |
| Entering (blow) time: | 1.8 sec |
| Releasing temperature: | 80 to 90 deg. C. (preform surface temperature) |
| Stretch blow molding conditions | |
| Mold temperature (set temperature): | 60 deg. C. |
| Stretch blow temperature: | 105 to 115 deg. C. (preform surface temperature) |
| Blow pressure (stretching): | primary pressure 4 to 5 kg/cm$^2$ secondary pressure 12 kg/cm$^2$ |
| Time interval from releasing till stretch blow molding: | 6 sec. |
| Stretching factor: | vertical (axial) 1.2 times, lateral (radial) 2.2 times |

Results

A milky white milk bottle of polyethylene uniform in wall thickness distribution without deviation of wall thickness in stretch area was obtained. When filled and dropped from a height of 2 m, no breakage was noted.

EXAMPLE 2

| Material resin: | Polyethylene (HIZEX 5100B, made by Mitsui Petrochemicals Co.) |
|---|---|
| Molded product: | Round straight bottle with narrow mouth (120 cc) |
| Dimensions: | overall height 126.7 mm, length beneath neck 114.7 mm, inside diameter of mouth portion 17.14 mm, outside diameter of body portion 45.5 mm, wall thickness of body portion 0.5 mm, weight 15.4 g |
| Preform | |
| Dimensions: | overall height 107.0 mm, inside diameter of mouth portion 17.14 mm length beneath neck 95 mm, wall thickness of body portion 3.2 mm, outside dia. of upper body portion 22.03 mm, outside dia. of lower end body portion 18.71 mm, draft 1.0 deg. |
| Preform molding conditions | |

-continued

Injection cylinder temperature:

| | |
|---|---|
| | nozzle 175 deg. C., |
| | front portion 210 deg. C., |
| | middle portion 210 deg. C., |
| | rear portion 195 deg. C. |

Injection mold temperature (set value):

| | |
|---|---|
| Cavity die: | upper portion 10 deg. C., |
| | cavity portion 102 deg. C., |
| | lower portion 10 deg. C. |
| Core die: | 80 deg. C. |
| Injection pressure (holding pressure): | 40 kg/cm² |
| Pressure holding time: | 5.45 sec |
| Cooling time: | 4.25 sec |
| Entered (blow) gas: | air |
| Entering (blow) pressure: | 9 kg/cm² |
| Entering timing: | right after completion of pressure holding |
| Entering (blow) time: | 4.25 sec |
| Releasing temperature: | 80 to 90 deg. C. (preform surface temperature) |

Stretch blow molding conditions

| | |
|---|---|
| Mold temperature (set temperature): | 60 deg. C. |
| Stretch blow temperature: | 105 to 115 deg. C. (preform surface temperature) |
| Blow pressure (stretching): | primary pressure 5 kg/cm², secondary pressure 12 kg/cm² |
| Time interval from releasing till stretch blow molding: | 6 sec. |
| Stretching factor: | vertical (axial) 1.16 times, lateral (radial) 2.2 times |

Results

A milky white round straight bottle of polyethylene uniform in wall thickness distribution without deviation of wall thickness in stretch area was obtained. When filled and dropped from a height of 2 m, no breakage was noted.

These embodiments were conducted by using the injection stretch blow molding machine model No. BS-0207 manufactured by A.K. TECHNICAL LABORATORY, INC. In addition, the injection stretch blow molding method conformed to the method disclosed in the Japanese Laid-open Patent Publication No. 4-214322.

According to the present invention, molded products of polyethylene such as containers with a thin-wall body which had been hitherto considered extremely difficult can be molded easily by stretch blow molding, and a multiplicity of molded products can be produced at one time. Besides, since it is possible to blow in a thin wall, it is more economical than blow molding method, and the drop strength is sufficient, and hence its value of industrial usage is immense.

What is claimed is:

1. A method for injection stretch blow molding of polyethylene comprising the steps of
   injection molding a predetermined preform by filling an injection mold comprising a cavity die, a core die and a lip mold with molten polyethylene,
   cooling the injection molded preform upon contact with the cavity die, core die and lib mold so that an inside skin layer and an outside skin layer are formed on the surface of the preform but an interior portion of the preform retains internal heat,
   injecting a gas into the boundary between the core die and inside skin layer of the preform before releasing the preform from the injection mold so as to isolate the inside skin layer of the preform from the core die and thereby suppress the cooling of the inside skin layer while continuing the cooling of the outside skin layer by the cavity die,
   releasing the preform from the cavity die and the core die of the injection mold while holding a mouth portion of the preform by the lip mold such that the surface temperature of the preform right after releasing is 80 to 90 deg. C. and the interior portion of the preform is at a higher temperature than the inside and outside skin layers, the internal heat warming the inside and outside skin layers after releasing the preform,
   transferring the preform into a blow die, and
   stretch blow molding the preform into a hollow thin-wall product before the surface temperature of the preform is elevated by the internal heat of the preform to 120° C.

2. A method for injection stretch blow molding of polyethylene according to claim 1, wherein the injection of gas is started right after completion of injection filling the injection mold with molten polyethylene.

3. A method for injection stretch blow molding of polyethylene according to claim 2, wherein the gas is injected at a pressure of 6–15 kg/cm².

4. A method for injection stretch blow molding of polyethylene according to claim 3, wherein the stretch blow molding is commenced in 4–7 seconds after releasing the preform.

5. A method for injection stretch blow molding of polyethylene according to claim 4, wherein the stretch blow molding is effected at a temperature 20°–30° C. higher than the surface temperature of the preform right after releasing.

6. A method for injection stretch blow molding of polyethylene according to claim 5, wherein the injected gas is at a pressure of about 9 kg/cm² and the blow molding temperature is about 25° C. higher than the surface temperature of the preform right after releasing.

7. A method for injection stretch blow molding of polyethylene according to claim 1, wherein the gas is injected at a pressure of 6–15 kg/cm².

8. A method for injection stretch blow molding of polyethylene according to claim 1, wherein the stretch blow molding is commenced in 4–7 seconds after releasing the preform.

9. A method for injection stretch blow molding of polyethylene according to claim 1, wherein the stretch blow molding is effected at a temperature 20°–30° C. higher than the surface temperature of the preform right after releasing.

10. A method for injection stretch blow molding of polyethylene according to claim 9, wherein the injected gas is at a pressure of about 9 kg/cm² and the blow molding temperature is about 25° C. higher than the surface temperature of the preform right after releasing.

* * * * *